US008446846B1

(12) United States Patent
Saleem et al.

(10) Patent No.: US 8,446,846 B1
(45) Date of Patent: May 21, 2013

(54) METHOD OF PASSING SIGNAL EVENTS THROUGH A VOICE OVER IP AUDIO MIXER DEVICE

(75) Inventors: Adnan Saleem, Surrey (CA); Neil Gunn, Coquitlam (CA); Yong Xin, Coquitlam (CA); Jagtar Gill, Surrey (CA); Alvin Chubbs, Vancouver (CA); Tim Woinoski, Coquitlam (CA)

(73) Assignee: Radisys Canada ULC, Burnaby BC (CA)

( * ) Notice: Subject to any disclaimer, the term of this patent is extended or adjusted under 35 U.S.C. 154(b) by 1322 days.

(21) Appl. No.: 12/023,724

(22) Filed: Jan. 31, 2008

Related U.S. Application Data

(60) Provisional application No. 60/887,992, filed on Feb. 2, 2007.

(51) Int. Cl.
 *H04L 12/16* (2006.01)
(52) U.S. Cl.
 USPC ........................................................ 370/260
(58) Field of Classification Search
 USPC ...... 370/503, 352, 401, 353, 259, 260; 714/6; 379/418, 88.01; 704/275; 348/14.09; 375/240.01; 709/203
 See application file for complete search history.

(56) References Cited

U.S. PATENT DOCUMENTS

| | | | | |
|---|---|---|---|---|
| 6,961,424 | B1 * | 11/2005 | Vialle et al. | 379/418 |
| 7,124,163 | B2 * | 10/2006 | Geofroy et al. | 709/203 |
| 8,027,335 | B2 * | 9/2011 | Ansari et al. | 370/353 |
| 2001/0033583 | A1 * | 10/2001 | Rabenko et al. | 370/503 |
| 2004/0062234 | A1 * | 4/2004 | LeBlanc et al. | 370/352 |
| 2005/0083912 | A1 * | 4/2005 | Afshar et al. | 370/352 |
| 2005/0210317 | A1 * | 9/2005 | Thorpe et al. | 714/6 |
| 2006/0023062 | A1 * | 2/2006 | Elbaze et al. | 348/14.09 |
| 2006/0026002 | A1 * | 2/2006 | Potekhin et al. | 704/275 |
| 2006/0104347 | A1 * | 5/2006 | Callan et al. | 375/240.01 |
| 2008/0056455 | A1 * | 3/2008 | Yang et al. | 379/88.01 |
| 2008/0095077 | A1 * | 4/2008 | Vadlakonda et al. | 370/259 |
| 2009/0122785 | A1 * | 5/2009 | Liu et al. | 370/352 |
| 2010/0278186 | A1 * | 11/2010 | Ackerman et al. | 370/401 |

* cited by examiner

*Primary Examiner* — Asad Nawaz
*Assistant Examiner* — Parth Patel
(74) *Attorney, Agent, or Firm* — Stoel Rives LLP

(57) ABSTRACT

In Voice-over-IP or like systems, audio mixers are used for implanting conferencing applications for IP networks. In such systems, a problem exists as how to pass through user signal events, such a DTMF digits, in-band as well as out-of-band telephony events (RFC 2833/4733) because they are not handled well in such systems. In accordance with the invention, a signalling event in incoming audio packets or user signalling event received out-of-band is detected at one of the inputs. A meta-data representation of the signal event is attached to the audio and passed through the mixer for regeneration, as in-band or out-of-band telephony events, on the other side of the mixer.

26 Claims, 3 Drawing Sheets

METHOD OF PASSING SIGNAL EVENTS THROUGH A VOICE OVER IP AUDIO MIXER DEVICE

CROSS REFERENCE TO RELATED APPLICATION

This application claims the benefit under 35 USC 119(e) of prior U.S. provisional application No. 60/887,992 filed Feb. 2, 2007, the contents of which are herein incorporated by reference.

FIELD OF THE INVENTION

This invention relates to the field of voice-over-IP audio mixer devices, and in particular to a method of passing user signalling events through such a device.

BACKGROUND OF THE INVENTION

Voice-over-IP audio mixer devices are used for implementing conferencing applications for IP networks. Audio signals, after being converted to IP packets are sent to these devices and the audio signals are mixed together and then output to the users such that they can hear a complete conference conversation without hearing their own voice. Such applications sometimes only mix certain users within the conference based on a criteria that they are the ones contributing to the conference.

User signal events are used to send information from one device to another. Over a voice-over-IP network, these signals may be embedded as part of the audio signal within the IP packet, such as in-band DTMF (Dual-tone Multi-frequency) or they may be sent as separate out of band packets, as RFC 2833 and RFC 4733.

There are several scenarios where it is useful to pass user signal event digits through a conference on an IP mixer device. In the first example, a customer support specialist might wish to help a new user setup a mailbox. The support specialists would need to have their DTMF digits reach the user's mailbox during the call. In the second example, during an attempt to add another member to a conference call, the operator reaches the member's mailbox. DTMF digits must reach the mailbox in order to drop the call in an expedient manner. This is far more effective than waiting or dropping the conference call and re-dialling. In the third example, while on a conference call, someone needs to confirm travel plans. He/she can dial into an IVR (Interactive Voice Response) system during the conference call to obtain confirmation. This again requires user signalling event pass-through.

Currently, voice-over-IP audio mixer devices have difficulty knowing how to handle these user signalling events for a conference. These signals are currently not passed through a conference application because they are either removed or distorted. In-band digits are normally removed by a DTMF clamping feature. Not being part of the audio stream, RFC 2833 or RFC 4733 digits also never reach the conference mixer. If the IP mixer does not clamp the DTMF signals found in the audio stream then the digits will pass through the conference mixer but are likely to become distorted in the mixing process. However, RFC 2833 and RFC 4733 signal events can never pass through as they are not part of the audio stream since they are signalled out of band.

While DTMF signalling events can be passed through a conference by not clamping these signals, this would only solve 1 of 4 possible scenarios required for passing through the events, namely the case where the sending and receiving users are both using in-band DTMF signalling events. The 3 other cases, RFC 2833/4733 to in-band DTMF, in-band DTMF to RFC 2833/4733, and RFC 2833/4733 to RFC 2833/4733 would not function. In addition, the quality of the in-band DTMF digits would be degraded by being mixed with the audio from other conference users thereby reducing the chances of proper digit detection at the receiving end.

Another issue is that conference mixers use algorithms that do not always mix all users at any moment during the conference. If an in-band event is present on one of the user's input but that user is not currently contributing audio to the conference mix then the digit will not be present on the output of the conference. Thus, a method is needed to guarantee that a digit will always be passed through to the output of the conference regardless of the signal event type or the operation of the conference mixer.

SUMMARY OF THE INVENTION

According to a first aspect of the invention there is provided a method of passing user signal events through a packet-based audio mixer device, typically Voice-over-IP (VoIP), having a plurality of user inputs and a plurality of user outputs, comprising detecting a signal event at one or more of said user inputs; placing a meta data representation of said signal event in an audio buffer associated with the user input at which the event was detected; passing said meta-data representation through said audio mixer with the user's audio data to a user output with a VoIP audio stream; and regenerating said signal event at a user output. The packet will normally be VoIP packets, but it will be appreciated by one skilled in the art that any suitable real time protocol could be employed.

Embodiments of the invention device allow any combination of signal event types to be propagated through a conference application, namely:

Out-Of-Band (RFC 2833/4733)→Out-Of-Band (RFC 2833/4733)
Out-Of-Band (RFC 2833/4733)→In-Band (DTMF)
In-Band (DTMF)→Out-Of-Band (RFC 2833/4733)
In-Band (DTMF)→In-Band (DTMF)

This mechanism allows for all four combinations of event types to be passed through the conference. This is useful as users within a conference may have different signalling types but must still be able to send events to each other. This will guarantee compatibility of event types between all these users.

When digit events are mixed through a conference, not only are they susceptible to being interfered with by other user's speech, but if two events from different users overlap in time, they may both not be detectable at the far end. The signal event pass through method in accordance with embodiments of the invention allows the digits to overlap at the input and still be detected at the far end. This can be accomplished by generating the first digit at the outputs of the mixer and once that digit is long enough to be detected by the receiving device, the mixer then generates the next digit. Although the input digit events are received overlapped in time, the state mechanism allows proper time separation of the digit events on the output, with sufficient digit event duration, to ensure accurate digit event detection by the receiving devices.

When digit events are mixed through a conference they are susceptible to being interfered with by another user's speech or audio announcement that may be played to the conference outputs. The signal event pass-through method in accordance with the invention avoids this problem by ensuring that the regeneration of digits to replace conference output audio for the duration of output digits. Additionally, this mechanism also allows users to pass through signal events while an audio announcement is playing to the conference.

Conference recording is a commonly used service offered by conferencing applications. In the absence of the novel signal event pass through mechanism, the conference recording would not include signalling events, as they would be clamped in-band and out-of-band. The signal event pass-through method allows insertion of in-band digit events that are inserted on the input of the conference mixer into the mixer's recorded media. Also, meta-data for the pass-through digits may also be included with the recorded media if the user does not desire the in-band DTMF digit audio within the recording.

Mixers used in conferencing applications should not send audio from a user back to that same user such that he/she hears his/her self. The signal pass-through method prevents the digit events from being sent back to the user who originated the event. This method prevents users from hearing their own input digits.

The signal pass-through method in accordance with the invention terminates any in-progress event outputs (after a required minimum event generation duration), when a new digit event is detected on any input. This mechanism guarantees that digits created with the signal pass-through method can not become "stuck on" for any reason.

Conference mixers use algorithms that do not always mix all users at any moment during the conference. The signal pass-through method will allow digits to be passed-through from a given user even if that user's audio is not part of the conference mix. This mechanism allows users that are not currently part of the mixed conversation to still be able to output digits to all the conference users.

Since the signal pass-through method converts signal events for a user into meta-data that is associated with the audio buffers representing the user's audio, the signal detection, mixer, and re-generation functionality may be distributed across physically separate processing units.

In conference applications, some users can be listen-only participants within the conference. Using the signal pass-through method, listen-only users still receive pass-through events even though these users can not contribute audio or events to the conference.

In a conferencing application, it may be desirable that only some users can have their signalling events passed through to the output of the conference and while other users are prohibited from passing their signalling events through the conference. The signal pass-through method allows enabling of pass-through events on a per port or per user basis for both event input and event output.

In conferencing applications, removal of DTMF signals by clamping the digits before they enter the conference mix may be desirable as users may not want to hear the digits. The signal pass-through method converts in-band DTMF digits to out-of-band digits (RFC 2833/4733) allowing signals to be passed through without DTMF audio being heard in the conference output.

The signal pass-through method allows event pass-through statistics to be generated on a per port (user), per mixer (conference), or on a system wide basis. The signal pass-through method also allows for signal events to be passed through a multimedia conference, containing both audio and video streams.

Since the signal pass-through method uses DTMF and RFC 2833/4733 digit generators to pass through the digits, the digit generation can terminate digits that appear to be "stuck on". This is done using a digit timeout feature that will terminate a digit after a period of time if an internal end event is not received on the output of the mixer. This will eliminate the possibility that pass-through digits will become stuck on as well as extremely long digits interrupting the conference output. This time out period, which is typically 2 seconds or longer, can be configured on a system wide basis.

In accordance with another aspect, the invention provides a method of transporting user signals events through a voice-over-IP audio mixer device implementing a conferencing application wherein said signal events are decoded and detected in incoming audio packets, codes represented by the signal events are inserted in buffers representing a user's voice signal, these buffers are passed through a mixer functionality where the signals are mixed, and are reproduced on the output side with a signal generator. In one embodiment, the ASCII code representing a digit is passed through the mixer device, and signal generators are used to generate the appropriate signal on all output for users who are contained in the conference application.

The signal events pass-through method enables event digits from any conference user (whether received as in-band DTMF or out-of-band RFC 2833/4733) to be passed through the conference to all other conference users (whether they are receiving them in-band DTMF or out-of-band RFC 2833/4733)

BRIEF DESCRIPTION OF THE DRAWINGS

The invention will now be described in more detail, by way of example only, with reference to the accompanying drawings, in which:—

DESCRIPTION OF THE PREFERRED EMBODIMENTS

The invention will be described specifically with reference to DTMF signals, although it will be understand that it has more general application to any user signals event passing through a Voice-Over-IP mixer device. The signal event pass-through method consists of attaching incoming detected DTMF signal events from a user, whether they come from an in-band DTMF or through an out-of-band RFC 2833/4733 stream, to the audio stream of a user as it passes though various subsystems from input to output, namely from the IP Media input interface, Decoder, Pre Processing, Mixer, Post Processing, Switcher, Encoder, and finally the IP Media output interface. Detected signal events are attached as meta-data to the audio buffer representing the user's audio signal in the system and each subsystem can examine this meta-data to perform the pass-through event features required. The conference mixer provides the same functionality for pass through events as it does with the users audio in that all users will receive an event from any other user in the conference. Listen-only users connected to the conference are also able to receive signal events but not contribute their event to the conference. After passing through the conference, the signal events are received by the in-band DTMF and/or out-of-band RFC 2833/4733 digit generators where the appropriate digit is generated as required by the user.

Figure 1:
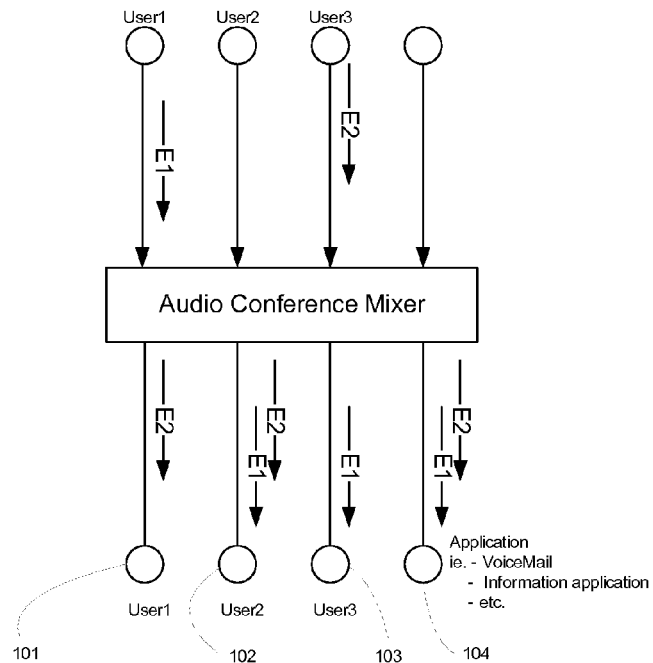
FIG. 1 shows a 4 port conference with signal event pass-through enabled on all ports.

FIG. 1 illustrates a typical audio conference application, which consists of three users 101, 102, 103 and an IVR 104 application on the 4$^{th}$ port of the conference mixer 100. User 101 first sends DTMF event E1 which is passed through to users 102, 103, and the application 104 but not back to user 101. After that, user 103 then sends DTMF event E2, which is passed through to users 101, 102, and the application 104.

Since the signal pass-through method allows either in-band DTMF or out-of-band RFC 2833/4733 for signal detection on the input and signal generation on the output, conversion between these events is possible. Once the signals have been converted or abstracted within the mixer device, the events do not have any specific type and thus can be generated in any format on the output. Thus, for participants within conferences who are using different event signalling, their events will still propagate to the other users even if their event types are different. For example, in FIG. 1, if user 101 is providing out-of-band RFC 2833/4733 events and user 101 sends an event which is received on port one of the conference, the event will pass-through to the outputs sent to users 102, 103 and output 104. User 102 may be providing in-band DTMF and thus the event on user 102's port will be regenerated using in-band signalling format. User 103 may be providing out-of-band RFC 2833/4733 and thus the event sent to user 103's port will be generated using out-of-band signalling format. Thus, this method handles all four cases of event pass through operability, in-band to in-band, out-f-band RFC 2833/4733 to in-band, in-band to out-of-band RFC 2833/4733, and out-of-band RFC 2833/4733 to out-of-band RFC 2833/4733.

Figure 2:
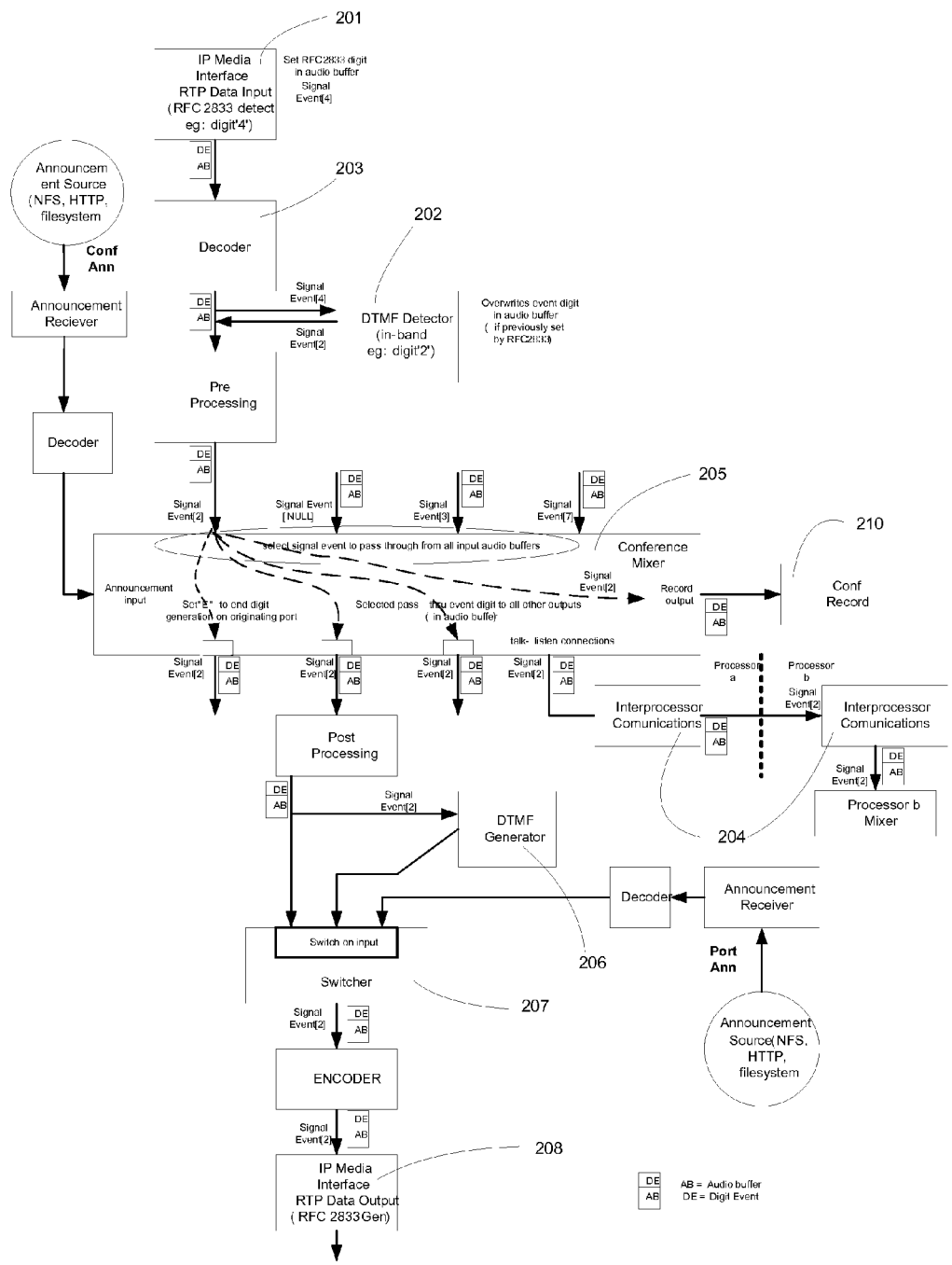
FIG. 2 is a block diagram of a signal event pass-through system.

FIG. 2 illustrates the flow of pass-through events from a user's input, through the conference mixer 205 and out to the other users outputs.

As shown in FIG. 2, the IP media interface 201 contains an out-of-band RFC 2833/4733 event detector which may be enabled or disabled depending on whether the user requires pass-through of its out-of-band RFC 2833/4733 events to the other users participating in the conference. An RFC 2833/4733 event detected at this input is stored as meta-data in the audio buffer (compressed at this point) that is a representation of the user's data at that point in time. The events are stored as meta data representations (for example ASCII codes for the digits 0-9, *#, and A-D, and E for the end event). At all other times, and while the input digit is in progress, a zero is stored. Thus, if for example, a RFC 2833/4733 digit 4 is detected on the input at 201, an associated meta data representation (for example ASCII 4) is placed in the buffer DE, AB representing that user's audio for that time period. For subsequent time periods, the value zero (NULL) is placed in the buffers until the end of the digit is detected at which point in time a associated meta data representation (for example ASCII "E") is placed in the audio buffer for that time period. If an RFC 2833/4733 event begins or ends during a period of silence suppression or packet loss of the audio media stream, an empty audio buffer is used to carry the pass-through event. Thus event pass-through of RFC 2833/4733 events will not be affected by the loss of audio packets due to silence suppression or packet loss.

The Decoder 203 subsystem passes on any pass-through events it receives from the RFC 2833/4733 detector in the audio buffers received from the IP media interface. It also decodes the audio buffer for each time period such that the conference mixer may mix the audio signal and allow in-band DTMF detectors to detect in-band digit events that also maybe passed through. These audio buffers, along with any possible pass-through event, are now output to the DTMF detector 202.

The DTMF Detector 202 is used to detect any in-band digits present in the audio buffers received from the Decoder. If it is enabled for pass-through detection and it detects a DTMF event, the beginning and end of the detected event is sent to subsequent subsystems, as done in the RFC 2833/4733 detector, by placing the event in the audio buffers it receives from the decoder for the time period of the event detection or end event detection. As handled by the RFC 2833/4733 detector, the outgoing events are stored in the audio buffer for the detected time period using meta data, for example ASCII codes for the digits 0-9, *, #, and A-D, and E. At all other times, and while the digit is in progress, a zero (NULL) is stored in the subsequent time period's audio buffers.

In order to prevent double digit detection from a RFC 2833/4733 detector with pass-through enabled, the DTMF detector 202 completely overwrites the meta-data stored in the audio buffer with its detected event digit. This may prevent events sent simultaneously in both out-of-band RFC 2833/4733 format and in-band DTMF from generating multiple concurrent events on the conference output.

The inter-processor subsystem 204 is able to receive and send audio buffers that contain associated pass-through events from ports or to ports or other applications on other processors and pass these events on to other subsystems such as the conference mixer. This mechanism is critical as the user's port will often be located on a different processor than the conference mixer. For signal pass-through method to function across processors the system must be able to transfer these events between the processors as well as subsystems operating within the same processor.

All other subsystems within the mixer device including pre-processing and post-processing subsystems are able to pass-through the digit events detected in the detectors connected above. This mechanism allows other services to be added to the conference application without affecting the event pass-through functionality.

The Conference Mixer 205 forwards digit events that it receives on incoming ports to all output ports excluding the output port that the digit event was received on. It also passes the event on to the recording output for the mixer so that the pass-through digits can be generated into the conference recording or stored along with the recording as meta-data. For each time period the conference mixer examines the incoming audio buffers for pass-through events and if one is found it is propagated to the output audio buffers of each users outputs with the exception of the port where the event was detected. For that port, an end event is sent instead of the event found. This is to guarantee that an event currently being regenerated on this port from a previous a pass-through event is terminated as new digit events must replace any current digit events being generated. If events are received on multiple inputs, the mixer will only propagate the first digit event that it processes. An end event received on an input of the conference mixer will be propagated to all output ports, since the mixer may not maintain state of the port on which the last digit was received and since the current event is complete, all ports should stop regenerating digits. Receiving an end event on a generator without previously receiving a digit event should have no effect.

Each input of the conference mixer can be configured to not process pass-through events and thus not propagate them from a particular input. This allows certain users to send pass-through events to conference participants while others are not allowed to pass-through events.

The conference mixer allows a conference announcement to be played into the conference mix such that all users can hear the announcement. The signal pass-through method allows this announcement to be played without affecting the digit events being passed through the conference. The events are stored in the audio buffers for each output even though the announcement audio is mixed in with the conference audio.

The conference mixer should have the ability to increment a global counter for each digit event that is passed through the conference. This counter is stored in status messages that are reported to the application controller so that they are able to determine the number of digits that are regenerated within the conference.

Conference recorder 210 is able to record audio signals passing through the mixer 205. It records these signals in association with the meta-data or signal event codes to permit these codes to be played back with the audio at a later date.

The DTMF Generator 206 begins DTMF digit generation for pass-through digit events it receives in audio buffers from subsystems above. The DTMF digit continues to be regenerated until an end event is received, a new digit event is received, or the maximum digit period is reached, whichever comes first. This maximum digit period is used to guarantee that a pass-through regenerated digit is never "stuck on". This value is configurable and is usually set to a value the can be tolerated by a user if the digit does become stuck so they will not hang-up. Since multiple users can generate pass-through events in the conference mixer, the DTMF generator must be able to regenerate pass-through digits that may overlap in time. Also, it is required that pass-through digits be regenerated such that they can be detected on the far end device. If two event digits overlap, then the regenerated digits must be spaced in time with a sufficient gap to allow the two digits to be differentiated by the receiving device. The DTMF generator does this by ensuring that there is a minimum gap of typically 50 ms, however not limited to 50 ms, between digits by delaying the start of the next digit by up to 50 ms. The DTMF Generator also ensures that each digit has a minimum duration of typically 50 ms, however not limited to 50 ms, so that it is detectable by the receiving device. The digit durations and gaps between digits may be configurable to facilitate a variety of receiving devices and also allowing the digit throughout to be adjusted. For example, an implementation inserting a minimum gap of 50 ms and digit duration of 50 ms results in a maximum rate for relaying digits to 10 digits per second. Also, the DTMF Generator 206 is capable of generating dial strings that the user or an application may request to be generated on a given port. Requested DTMF generation will interrupt a pass-through digit that may be in progress. Further pass-through digits are ignored until the generation of the dial-string is completed.

The following described the rules for determining actions, given different scenarios for DTMF pass-through regeneration:

1. If a user is currently requested a DTMF digit string be played to its port then any received pass-through digit events will be ignored.
2. If a pass-through digit event is being generated and a user or application requests a new DTMF digit string be played to its port, the current pass-through digit will immediately end, a minimum gap, typically 50 ms, must be generated and the requested DTMF digit string generation will be started.
3. A generated DTMF digit duration from a digit event will be a minimum duration, typically at least 50 ms in length. The generated digit will also have typical minimum gap of 50 ms after the digit.
4. If a new pass-through digit event is received, and a current event is being generated but has not met the minimum length and gap requirements, then the digit event will be buffered. The length of this buffer may be implementation dependent, however, a typical implementation may retain only one event in the buffer. In the example of a single digit event buffer, if a new event is received and one is already buffered then it will replace the buffered event.
5. If a new pass-through digit event is received, and a current event is being generated and has met the minimum length, then the current digit event generation should end and the next digit should be generated after the minimum gap requirement has been satisfied.
6. If a pass-through digit is being generated and an internal end event is received then the digit will end and the digit generator will wait for the minimum gap requirement before any new events are generated.
7. Any internal end events received when a pass-through digit is not being generated are ignored.
8. If a generated event is longer than a maximum period of time, typically 3 seconds, the event will end and a minimum gap will be generated.

Figure 4:
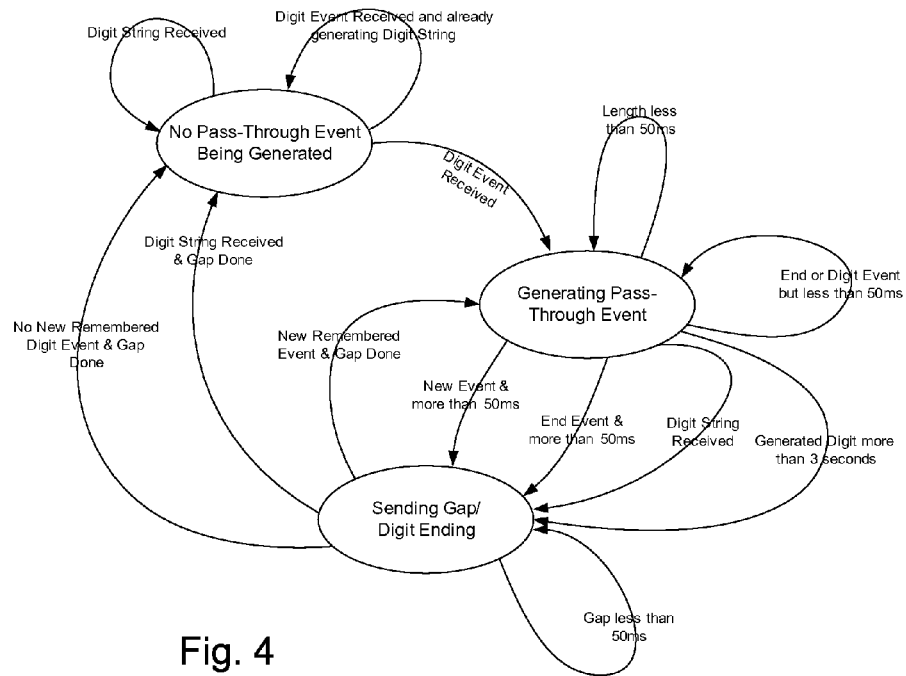
FIG. 4 shows the state transition diagram for generating pass-through events.

The state diagram that describes the implementation of these rules for the DTMF generator can be found in FIG. 4.

Figure 3:
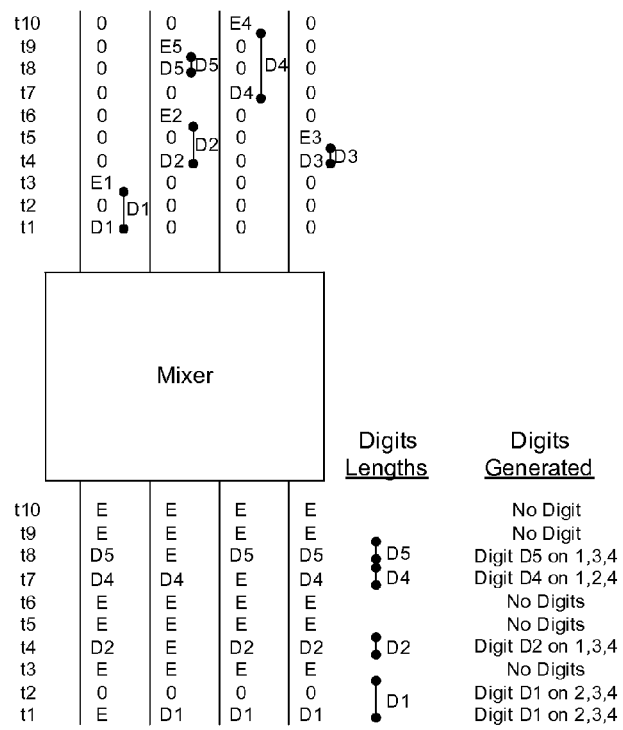
FIG. 3 shows how the pass-through event method passes through overlapping digits from different users.

FIG. 3 shows a conferencing example with signal pass-though method enabled where several signal events are overlapping. It illustrates how these events will be regenerated in time. In the example, digit event D2 and D3 occur at the same instant in time and thus D3 will not be passed through the conference mixer. However, D3's end event will cause the regeneration of digit D2 to end earlier than would have occurred if the end event for D2 was used to stop the digit. The regenerated D2 digit will be regenerated with a minimum length as specified above. Digit events D4 and D5 overlap in time but do not occur at the same time. The DTMF generator will recreate the digits as shown including a minimum digit length and a minimum gap between two consecutive generated digits.

In the user signal event pass-through method, the DTMF generator and the conference output are both connected to the Switcher 207. The switcher is used to replace the user's output audio with the in-band pass-through events that are to be regenerated. Thus, if a pass-through event is being regenerated the switcher will output only the in-band DTMF signal until the digit event has ended. The switcher will also replace announcement audio with in-band pass-through events if an announcement is being played to the port. This replacement method is used to avoid the degradation of generated in-band events due to mixing with the conference audio.

The IP Media Interface 208 will also receive digits pass-through events, located in the output audio buffers, such that the out-of-band RFC 2833/4733 pass-through digits can be generated. The digit events are generated using the identical method as was given in the DTMF generator subsystem described above. The out-of-band RFC 2833/4733 generation of pass-through events may be enabled or disabled depending on the signal event types the user is expecting.

Sub-Systems

Figure 5:
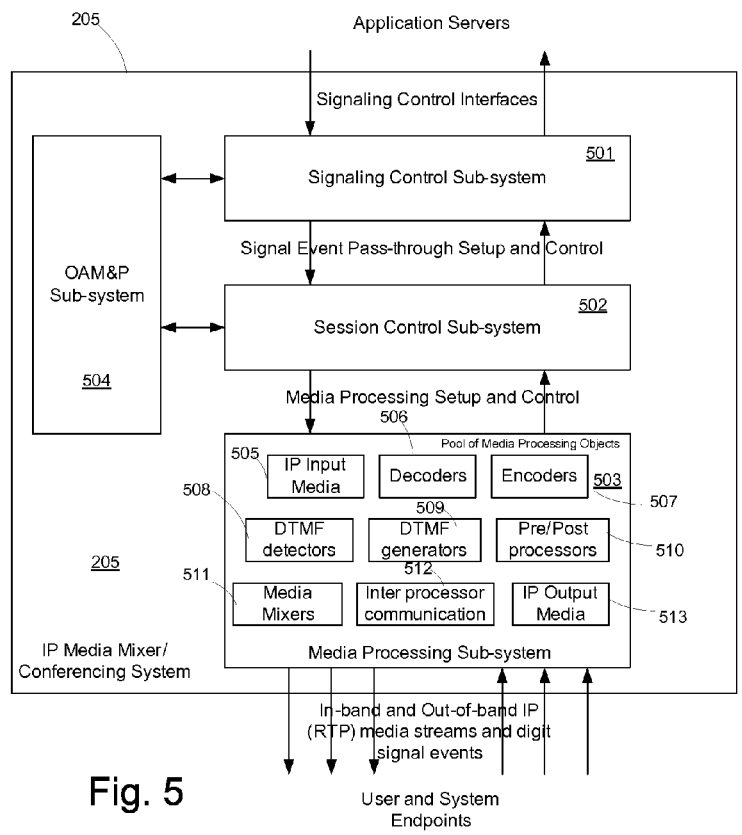
FIG. 5 describes the Signalling Control sub-system, Session Control sub-system, Media Processing sub-system, and the OAM&P (Operations, Administration, Management, and Provisioning) sub-systems employed in the inventive method.

The signal event pass-through method described is implemented within four sub-systems, shown in FIG. 5, namely a signalling control interface sub-system 502, a session control sub-system 502, a media processing sub-system 503, and an OAM&P (Operation, Administration, Maintenance, and Provisioning) sub-system 504. The description above relates mainly to the media processing sub-system 503, which includes input media module 505, decoders 506, encoders 507, DTMD detectors 508, DTMF generators 509, pre/post processors 510, media mixers 511, inter processor communication module 512, and IP output media 513. The various modules function as described above to implement the pass through method.

The signal event pass-through mechanism, described above, may be enabled or disabled on a per user basis under the control of any appropriate signalling protocol, typically between an application server and a media server which provides the audio conferencing mixer functionality. Mechanisms controlling this functionality may be implementation dependent however this mechanism is typically configured via an operator controlled interface (e.g.: OAM&P or SNMP) or a signalling control protocol interface (e.g.: SIP-RFC 3261, RFC 4241, MGCP, H.248, etc.). The OAM&P would apply the same configured setting to all calls processed by the media server, while the control protocol interfaces can configure user specific options on per call basis using industry standard interfaces such as SIP (RFC 3261) and RFC 2327 and RFC 4566.

The signalling control interfaces, as described above, which enable, disable, and apply variations of in-band or out-of-band digit events interface expected by each user. Requests initiated by the signalling control interfaces are setup utilizing the media processing algorithms for IP media input, Decoders, Pre-Processors, DTMF detectors, Audio Mixers, DTMF generators, Post-Processors, Encoders, and IP media output algorithms. The requests received over the signalling interfaces are carried out or executed by an intermediary Session Control layer, residing between the upper Signalling Control interface layer and the lower Media Processing layer. The Session Control layer provides a level of abstraction and a flexible mechanism to inter-connect and correctly sequence the media processing objects in a variety of combinations of input and outputs as requested on a per user or system wide basis. FIG. 5 describes the interfaces between the various sub-systems embodied by the signal event pass-through method.

The Session Control layer is also used to estimate the load on a system, in real-time, and is used to optimize the utilization of the pool of media processing objects. Signal event pass-through requests, initiated via the signalling control interfaces described above, may be accepted or rejected by the Session Control layer based on the current and projected system load required to fulfill the given request. Signal events pass-through statistics and resource utilization counters are managed and reported by the Session Control layer.

The Session Control layer also provides a mechanism to inter-connect media processing objects co-located on the same processor or distributed across processor, based on the load balancing and optimization requirements of the system. As well, concurrent services such as audio announcements played to conference mixers, DTMF dial string generation, conference recording with and without signal events in the recorded media, and signal event pass-through services are setup and co-ordinated by the Session Control layer dynamically and in real-time.

We claim:

1. A method of passing user signal events through a packet-based audio mixer device implementing a conference application and having a plurality of user inputs and a plurality of user outputs, said method comprising:

decoding and detecting a signal event in incoming audio packets at one or more of said user inputs, the signal event comprising information content for controlling a device;

placing a meta data representation of said signal event in an audio buffer with a user's audio data associated with the user input at which the event was detected;

passing said meta data representation through said audio mixer with the user's audio data to a user output with a packet audio stream; and selectively regenerating, from said meta data representation, said signal event at a user output, wherein selectively regenerating comprises selecting between ignoring the meta data, regenerating the meta data as an in-band signaling event, and regenerating the meta data as an out-of-band signaling event, wherein said signal event comprises an in-band audio event, a decoder decodes audio streams at a user input, and said in-band audio event is detected by an audio event detector and converted to said meta data representation for placement in said audio buffer, and wherein said in-band audio event comprises a dual-tone multi-frequency (DTMF) event, which is decoded and converted to said meta data representation.

2. The method of claim 1, wherein said meta data representation is placed in a buffer associated with the user's audio stream.

3. The method of claim 1, wherein the meta data representation comprises codes representing the information content of said signal event.

4. The method of claim 3, wherein said codes comprise alphanumeric codes.

5. The method of claim 1, wherein said signal event is carried by out-of-band packets.

6. The method of claim 5, wherein during periods of packet loss or silence, meta data representations are placed in empty audio buffers.

7. The method of claim 1, wherein the audio event detector overwrites any meta data in the audio buffer of the corresponding user.

8. The method of claim 1, wherein said signal event includes end events, and said signal event is regenerated at a user output until an end event is received.

9. The method of claim 1, wherein a predetermined minimum gap is placed between successive signaling events passed through said audio mixer.

10. The method of claim 1, further comprising recording audio passing through said audio mixer, wherein said signal event is recorded as said meta data representation associated with said audio so that said signal event is recorded without interfering with the audio record.

11. The method as claimed in claim 1, wherein a signal event regenerator terminates signal events after a predetermined period of time if no internal end event signal is received.

12. A system for passing audio signals between a plurality of users during a conference call, comprising:

a packet-based audio mixer for passing packet-based audio signals between a plurality of user inputs and a plurality of user outputs in a conference application;

a decoder for decoding the packet-based audio signals at one or more of said user inputs;

a detector for:

detecting an audio signaling event in at least one of the user inputs in incoming audio packets, the audio signaling event comprising an in-band audio event including information content for controlling a device, wherein said in-band audio event comprises a dual-tone multi-frequency (DTMF) event;

creating a meta data representation of the audio signaling event; and placing said meta data representation in an audio buffer associated with a user's audio stream of input to said audio mixer; and a regenerator for selectively regenerating, from said meta data representation, said audio signaling event at a user output after said meta data representation has passed through said audio mixer, wherein selectively regenerating comprises selecting between ignoring the meta data, regenerating the meta data as an in-band signaling event, and regenerating the meta data as an out-of-band signaling event.

13. The system of claim 12, wherein said packet-based audio signals comprise Voice over IP (VoIP) packets, and said decoder is configured for decoding a VoIP audio stream at one of said inputs, and wherein said detector is configured to detect said audio signaling event as in-band signals in said decoded VoIP audio stream and create said meta data.

14. The system of claim 13, wherein said detector includes a DTMF detector.

15. The system of claim 14, further comprising a DTMF generator at said user outputs for regenerating DTMF input signaling events.

16. The system of claim 12, further comprising a packet media interface for receiving packet media, said packet media interface detecting additional audio signaling events as out-of-band signals.

17. The system of claim 16, further comprising an encoder at said user outputs for regenerating said signaling events as out-of-band packets.

18. The system of claim 12, wherein said audio mixer comprises a plurality of processors for processing said audio signals, and an inter-processing sub-system for transferring audio buffers containing said meta data representations between said processors.

19. The system of claim 12, further comprising a recorder for recording said audio signals passing through the audio mixer and said meta data representations of the signaling events to permit playback of the audio with the audio signaling events.

20. The system of claim 12, wherein said audio mixer is configured to forward incoming signaling events arriving as meta data representations to all active ports participating in a conference with the exception of the incoming port.

21. The system of claim 12, wherein said audio mixer includes a signaling control subsystem, a session control sub-system, a media processing sub-system, and an OAM&P (Operation, Administration, Maintenance and Provisioning) sub-system.

22. The system of claim 12, wherein selectively regenerating the meta data as an in-band signaling event comprises separating the regenerated signal event from the user's audio to avoid degradation of the information content.

23. A method of transporting user signals events through a packet-based audio mixer device implementing a conferencing application, comprising:

decoding and detecting signal events in incoming audio packets, the signal events comprising in-band audio events including information content for controlling a device, wherein a decoder decodes audio streams at a user input of said audio mixer, and said in-band audio events are detected by an audio event detector and converted to codes;

inserting said codes corresponding to the signal events in buffers representing a user's voice signal;

passing said buffers through the mixer where the signals are mixed; and selectively reproducing, from said codes, said signal events on the output side of the mixer with a signal generator as either an in-band signaling event or an out-of-band signaling event, wherein said in-band audio events comprise dual-tone multi-frequency (DTMF) events, which are decoded and converted to said codes.

24. The method of claim 23, wherein said codes are American Standard Code for Information Interchange (ASCII) codes representing digits, and the ASCII codes are passed through the mixer device, and signal generators are used to generate the appropriate signal on all output for users who are contained in the conference application.

25. The method of claim 23, wherein the selectively reproduced signal events are separate from the user's voice signal to avoid degradation of the information content.

26. The method of claim 1, wherein selectively regenerating the meta data as an in-band signaling event comprises separating the regenerated signal event from the user's audio to avoid degradation of the information content.

* * * * *